(12) United States Patent
Lee

(10) Patent No.: US 6,707,507 B2
(45) Date of Patent: Mar. 16, 2004

(54) APPARATUS AND METHOD FOR ON SCREEN DISPLAY

(75) Inventor: In Ho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 351 days.

(21) Appl. No.: 09/799,401

(22) Filed: Mar. 5, 2001

(65) Prior Publication Data

US 2003/0020735 A1 Jan. 30, 2003

(30) Foreign Application Priority Data

Mar. 6, 2000 (KR) .......................................... 2000-11075

(51) Int. Cl.$^7$ ................................................. H04N 9/76
(52) U.S. Cl. ........................ 348/598; 348/597; 348/569
(58) Field of Search ................................. 348/597, 584, 348/590, 598, 569, 576, 600; 345/629; 382/232, 276

(56) References Cited

U.S. PATENT DOCUMENTS 5,495,539 A * 2/1996 Sieverding ................... 382/276
5,552,805 A * 9/1996 Alpher ......................... 345/153
6,466,220 B1 * 10/2002 Cesana et al. ............... 345/537
6,507,672 B1 * 1/2003 Watkins et al. .............. 382/232

* cited by examiner

Primary Examiner—Victor R. Kostak
(74) Attorney, Agent, or Firm—Lee, Hong, Degerman, Kang & Schmadeka

(57) ABSTRACT

An OSD apparatus for displaying an image using first and second video input signals and a blend coefficient value comprises a region search device for generating an output signal, wherein the output signal is responsive to Human Visual System (HVS) characteristic elements and the first and second video input signals, and an α controller responsive to the blend coefficient value and the output signal from the region search device. Preferably, contrasts of the first and second video input signals are used as one of the HVS characteristic elements. In particular, the contrasts of the first and second video input signal are obtained by selectively considering contrast of at least one of horizontal, vertical, and diagonal directions. Alternatively, the contrast is obtained by using a Y component when the first and second video input images are YUV images.

36 Claims, 4 Drawing Sheets

APPARATUS AND METHOD FOR ON SCREEN DISPLAY

CROSS REFERENCE TO RELATED ART

This application claims the benefit of Korean Patent Application No. 2000-11705, filed on Mar. 6, 2000.

BACKGROUND OF THE INVENTION

1. Field of the Invention

The present invention relates to an on screen display system, more particularly to an apparatus and method for simultaneously displaying different image signals using a blending method.

2. Discussion of the Related Art

In a display device, On-Screen Display (OSD) technology is used to process various image signals and display the selected images on a screen. OSD technology is one type of character display techniques that displays various data such as channel number and volume on a TV screen. It displays such data in a character, figure, or graphic format. OSD technology can simultaneously provide a user with displayed image data and other data, such as a caption, and allows the effective use of an image processing system.

It is expected that the OSD method will be further developed in the future in conjunction with the rapid development of related technologies. One example is the ASIC technology used in digital television or display devices. Suppliers of these devices will request, in light of consumer expectations with regards to on screen displays, improved levels of OSD technology.

A Color Look-Up Table (CLUT) of 16 entries is generally used in the OSD. The CLUT is a table that stores color data such as Y, Cb, and Cr, which represents the OSD. In the case where a bit map of 2 bit/pixel is used, the CLUT requires a color map as an intermediate step because it cannot directly use the bit map of 2 bits per pixel as an address of the CLUT. In the case where a bit map of 4 bits per pixel is used, the CLUT does not require a color map because the bit map can be used directly as an input address of the CLUT. In cases where a bit map of greater than 4 bit/pixel is used, the CLUT should have 16 entries or more. Dimensions of the bit map in the OSD are generally within the range of 720×480 (NTSC mode) or 720×576 (PAL mode). Also, in the above cases where a bit map is used, the data transmission amounts between an external memory and an OSD controller can be increased if the dimensions of the bit map stored in the external memory are great. However, the data transmission amount is reduced in the OSD image because infrequent occurance of a temporal variance of the OSD image.

For example, since a caption maintains a uniform bit map for one to two seconds, the bit map does not change for 50 to 60 frames. Also, in the case of an OSD screen that displays a menu selection on an initial screen, the OSD bit map is unchanged until a viewer selects one of the menu.

The blending method is one example of the various OSD technologies. The blending method simultaneously displays different images by making the images translucent. The blending method is one of the most important OSD technologies.

In the blending method, a blended image Out1 is displayed by adding a first image signal V1 to a second image signal V2 based upon a blend coefficient ($\alpha$-coefficient) previously set in a pixel unit. This operation can be expressed as follows:

$$Out1 = \alpha \times V1 + (1-\alpha)V2 \qquad (1)$$

V1: optional image signal
V2: image signal to be added
$\alpha$: blend coefficient In the above formula (1), the blend coefficient $\alpha$ has a value of $0<\alpha<1$. As an example, supposing that $\alpha=0.3$, the image signal $$V1 \text{ of } \frac{3}{10}$$

is reflected to the output image Out1, while the image signal $$V2 \text{ of } 1 - \frac{3}{10} = \frac{7}{10}$$

is reflected to the output image Out1.

Accordingly, the image signals V1 and V2 are displayed on the screen at a transparency ratio reflected by the calculation.

The above OSD technology is implemented in hardware as shown in FIG. 1. Referring to FIG. 1, a related art OSD apparatus includes a first combining unit 3 for combining a predetermined blend coefficient $\alpha$ with a predetermined image signal V1, a subtractor 1 for outputting a value obtained by subtracting the blend coefficient $\alpha$ from 1, a second combining unit 2 for combining a value output from the subtractor 1 with another image signal V2, an adder 4 for adding a value of the first combining unit 3 to a value of the second combining unit 2, and a rounding/limiting unit 5 for receiving a signal output from the adder 4 and controlling its final output signal.

The rounding/limiting unit 5 forcibly converts an input value exceeding 255 to a value of 255 in case of 8-bit image (the contrast range of 0 to 255), and also forcibly converts an input value of less than 0 to 0. As a result, the final output signal does not depart from the contrast range.

The aforementioned related art for OSD technology has an advantage in that it can be simply implemented in hardware when displaying two different images using the blending method. However, the related art has several disadvantages. For example, some resulting images may be difficult to identify in a specific image region. This is due to the fact that it applies the same blend coefficient $\alpha$ to all of the image regions, regardless of the basis that cognition of a human being on an image is varied depending on the characteristics of the image regions. Because of the above reason, it may also cause a phenomenon where respective input images appear to be blended at different ratios depending on the regions.

SUMMARY OF THE INVENTION

Accordingly, the present invention is directed to an OSD apparatus and method for displaying on-screen images that substantially obviates one or more of the problems due to limitations and disadvantages of the related art.

To solve the above problems, an object of the present invention is to provide an OSD apparatus and method for displaying output images in which all input images are reflected. All input images would be reflected upon resultant images by identifying a Human Visual System (HVS) in an image region displayed on a screen and a peripheral region.

To achieve the above object, an apparatus for displaying an OSD according to the present invention includes a region search device for obtaining characteristic elements of a Human Visual System (HVS). The device searches the respective regions of an image and calculates either a blend coefficient value based on the following: HVS or a parameter which changes an input image, α controller for designating a blend coefficient value α using the blend coefficient α or parameter calculated by the region search device.

According to one embodiment of the present invention, an OSD apparatus for displaying an image using first and second video input signals and a blend coefficient value, comprises a region search device for generating an output signal, wherein the output signal is responsive to Human Visual System (HVS) characteristic elements and the first and second video input signals; an α controller responsive to the blend coefficient value and the output signal from the region search device, wherein the α controller outputs a controlled blend coefficient; a first combining unit for combining the controlled blend coefficient with the first video input signal; a subtractor for outputting a difference between a predetermined value, for example 1, and the controlled blend coefficient; a second combining unit for combining an output from the subtractor with the second video input signal; an adder for adding output values of the first combining unit and the second combining unit; and a rounding/limiting unit for controlling an output from the adder within a predetermined contrast range.

According to one aspect of the present invention, the contrasts of the first and second video input signals are used as one of the HVS characteristic elements. Preferably, the contrasts of the first and second video input signal are obtained by selectively considering contrast of at least one of horizontal, vertical, and diagonal directions. Alternatively, at least one of frequency, background brightness and contrast is selectively used as the HVS characteristic elements.

According to another aspect of the present invention, the contrast is obtained by using a Y component when the first and second video input images are YUV images.

According to another aspect of the present invention, the controlled blend coefficient is determined by using contrasts of the first and second video input signals, the controlled blend coefficient being the same as the blend coefficient when the contrasts of the first and the second video input signals are low.

According to another aspect of the present invention, the controlled blend coefficient is determined by using contrasts of the first and the second video input signals, the controlled blend coefficient being adjusted from the blend coefficient when a contrast difference between the first and the second video input signals is high. Preferably, the controlled blend coefficient is adjusted by the contrast difference divided by $2^n$, wherein n is a number of bits representing each one of the first and the second video input signals.

According to another aspect of the present invention, the controlled blend coefficient is determined by using contrasts of the first and the second video input signals, the controlled blend coefficient being adjusted from the blend coefficient when the contrasts of the first and the second video input signals are high. Preferably, the controlled blend coefficient is adjusted by the contrast difference divided by $2^n$, wherein n is a number of bits representing each one of the first and the second video input signals.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

The following is a detailed description of a preferred embodiment of the OSD apparatus and method for displaying on-screen images according to the present invention made with reference to the accompanying drawings.

Figure 1:
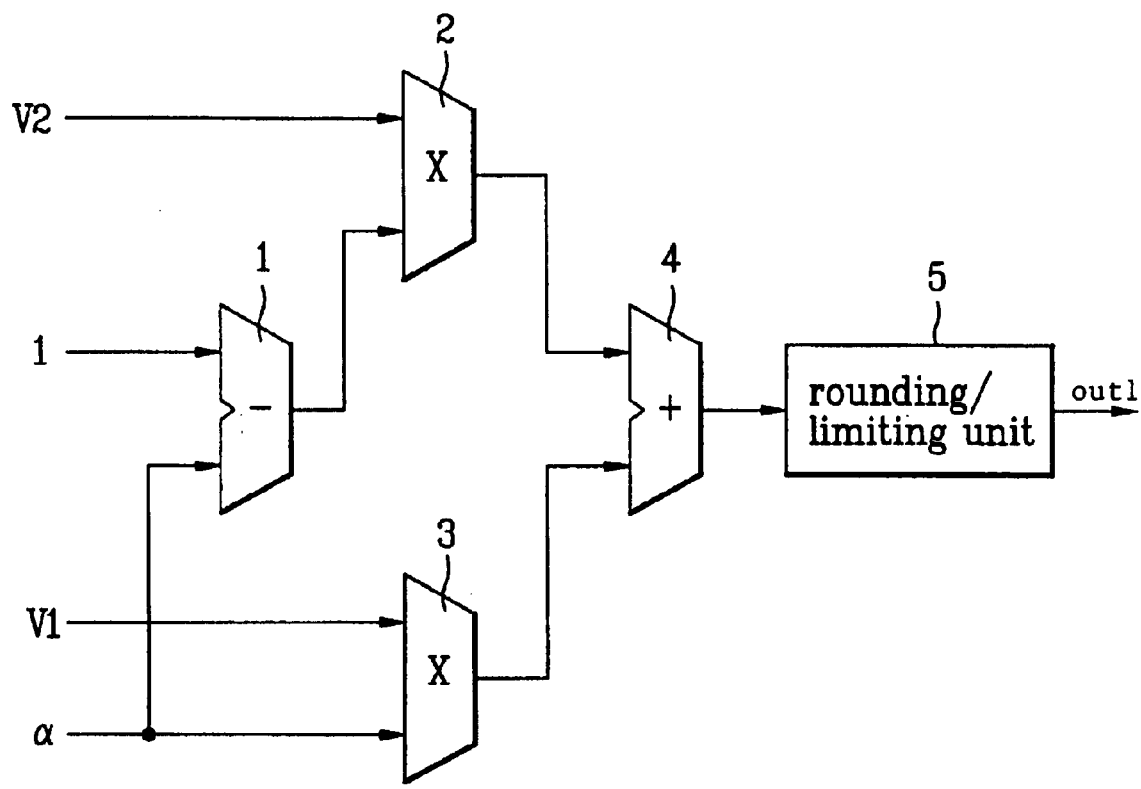
FIG. 1 is a schematic diagram of a related art apparatus for performing OSD.
Figure 2:
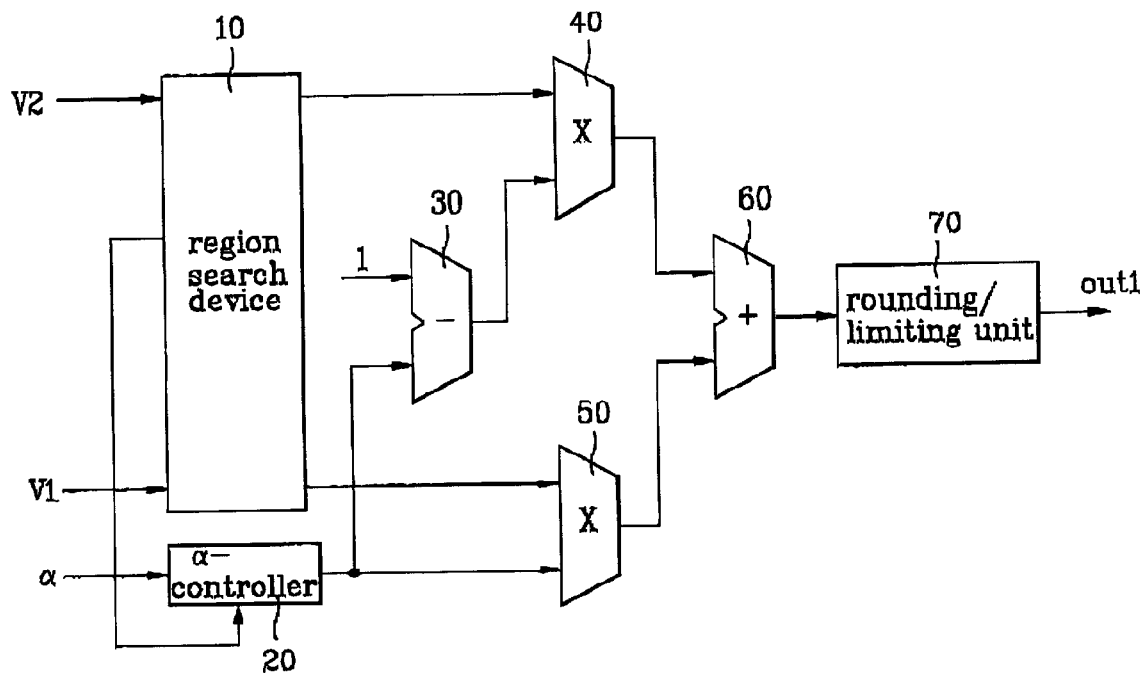
FIG. 2 is a schematic diagram of an apparatus for displaying an OSD according to a preferred embodiment of the present invention.

FIG. 2 is a schematic view showing an OSD apparatus according to the present invention. Referring to FIG. 2, the OSD apparatus according to the preferred embodiment of the present invention includes a region search device 10 for obtaining characteristic elements of a Human Visual System (HVS) for search of respective regions of an image. In response to a first image V1 and a second image V2, the region search device 10 calculates either a coefficient value α based on the HVS or a parameter which changes an input image signal. The OSD apparatus also includes an α controller 20 for determining a blend coefficient value α using the blend coefficient α provided as an input and parameters calculated by the region search device 10. Preferably connected to the α controller 20 is a first combining unit 50, such as a multiplier, for combining the blend coefficient α designated by the a controller 20 with an optional image signal V1. Also connected to the α controller 20 is a subtractor 30 for outputting a value obtained by subtracting the blend coefficient α from 1. The OSD apparatus also includes a second combining unit 40 connected to the region search device 10 and the subtractor 30 for combining a value output from the subtractor 30 with another image signal V2. An adder 60 is preferably provided in the OSD apparatus for adding an output value of the first combining unit 50 to an output value of the second combining unit 40. The OSD apparatus also includes a rounding/limiting unit 70 for controlling the output signal from the adder 60 to be within a predetermined contrast range. For example, the contrast in the rounding/limiting unit 70 is preferably within the range of about 0 to 255 for an 8-bit image, and it is within the range of about 0 to 65535 for a 16-bit image.

According to the preferred embodiment, the region search device 10 calculates parameter values to facilitate hardware implementation. In particular, a HVS is generally used when a better picture quality is desired. Three features of the HVS that are widely used are as follows. First, image data having a higher frequency are more susceptible to the HVS than image data having a lower frequency. Second, picture quality is varied depending on the brightness of the background. In particular, the background with an intermediate brightness is more susceptible to the HVS than the bright background or the dark background. Third, image data having a lower contrast are more susceptible to the HVS than image data having a higher contrast.

The region search device 10 may consider all three features of the HVS described above. Alternatively, the region search device 10 may consider only the more effective feature among the three features or other HVS characteristics known to one of ordinary skill in the art. According to the preferred embodiment, the region search device 10 is responsive to frequency characteristics, brightness of the background, and image contrast to calculate a parameter value that can be used by the $\alpha$ controller 20.

A method for applying the obtained contrast to the OSD apparatus according to the preferred embodiment of the present invention is as follows. Generally, the HVS has a low degree of recognition error near the portion where brightness is rapidly varied. However, the HVS has a high degree of recognition error near portions where brightness is slowly varied. Such a variation of brightness is called contrast. As a result, the contrast acts as a significant component in the fields of image compression and image processing. A value $\alpha$ is slowly varied based on the contrast, so that the entire resultant images appear to be seen as similarly blended in view of the HVS.

Figure 3:
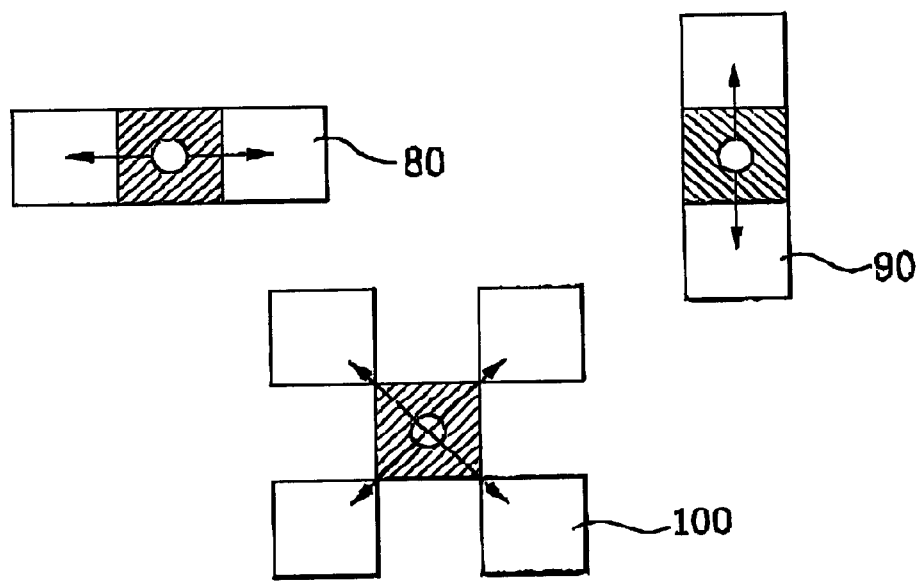
FIG. 3 shows methods for obtaining contrast according to the present invention.

As shown in FIG. 3, according to the preferred embodiment, the contrast for a horizontal component 80, a vertical component 90, and a diagonal component 100 is processed and obtained by the region search device 10. In particular, the region search device 10 is responsible for obtaining the contrast values in, for example, three spatial directions of respective input images using the method of FIG. 3. Alternatively, other spatial directions may be used to obtain the necessary image contrast values.

Images from a color television camera, TV tuner, or video tape recorder are generally represented in a composite video format. This format describes each pixel color using a luminance value (typically called Y) and two chrominance values (typically called U and V). When the input image is a YUV-image, the contrast is obtained using a brightness component Y rather than a color component UV. This is due to the fact that the eyes of a human are more susceptible to the brightness component than the color component. The obtained contrast has a value ranged from, for example, a minimum value of 0 to a maximum value of 255 when the Y-component is an 8-bit input image. This range is known as a contrast range.

When a value of the input image exceeds or is less than the contrast range, the rounding/limiting unit 70 forcibly controls the input image to fall within the above contrast range. Also, when applying two-input images, the weighted values of the contrasts respectively obtained in horizontal, vertical, and diagonal directions for each pixel are differentiated and then averaged to divide the respective regions.

Figure 4:
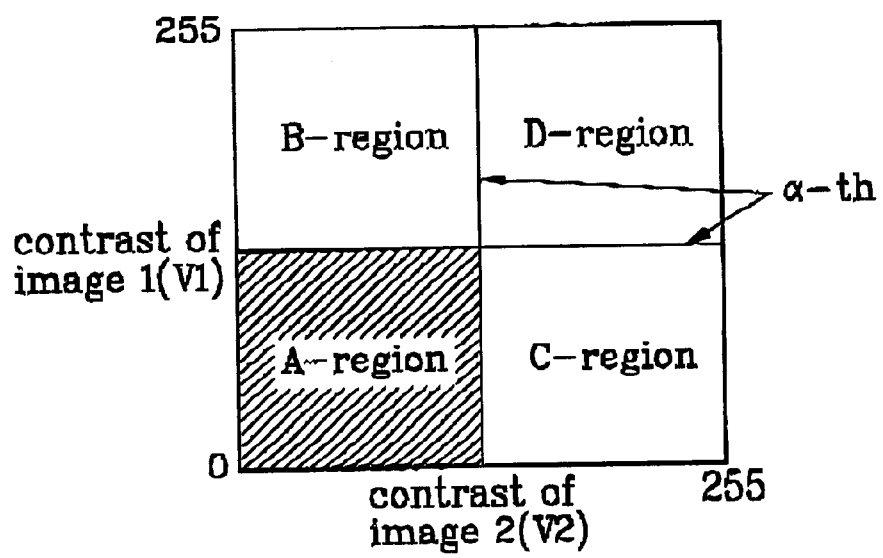
FIG. 4 shows divided regions depending on the contrast of FIG. 3.

The divided regions are preferably expressed as shown in FIG. 4. The divided regions shown in FIG. 4 is an illustration using an 8-bit input image. When a higher bit input image is used, the contrast ranges are increased accordingly.

Referring to FIG. 4, two input images have a low contrast in region A, while only one of two input images has a high contrast in regions B and C. In region D, the two input images have a high contrast. The respective regions of FIG. 4 may be divided by choosing a value between 0 to 255. However, it is desirable that a boundary line ($\alpha$-th) of respective regions be preferably determined by an average brightness value of between about 100 and 150.

As described above, the HVS is less susceptible to error in a region where brightness is rapidly varied. However, it is more susceptible to error in a region where brightness is slowly varied. In other words, the variations of brightness are not likely to be recognized in a region having high contrast while even small variations of brightness are likely to be recognized in a region having low contrast.

In the case of blending two input images, a blended input image with respect to one reference image may be regarded as an error against the original image. Accordingly, two input images should be blended with each other to allow both of them to be desirably recognized.

In region A of FIG. 4, the two images have low contrast. In region A, the two images are desirably recognized even if the blend coefficient value $\alpha$ obtained in formula 1 is unchanged. Accordingly, the blend coefficient value $\alpha$ is used as it is in region A.

In regions B and C, one input image has a high contrast pixel value and the other input image has a low contrast value. In this case, the blend ratio is decreased by a predetermined value in the image having a high contrast while it is increases by a predetermined value in the image having a low contrast.

In region D, the contrast of one input image is compared with the contrast of the other input image so that the value $\alpha$ is controlled in the same manner as region B or C.

As described above, the contrast in the respective regions of the input images is obtained. The blend ratio of the input image having a low contrast, in which a small image contrast of a peripheral pixel is easily recognizable by the human eye, becomes lower, by a predetermined value, than the blend ratio of the input image having a high contrast.

When two input images are blended with each other without using the obtained contrast, the blend coefficient is contrarily applied so that the respective input images in all of regions of the resultant images appear to be blended visually at the same ratio. This sufficiently reflects the characteristics of the respective input images upon the resultant images.

Figure 5:
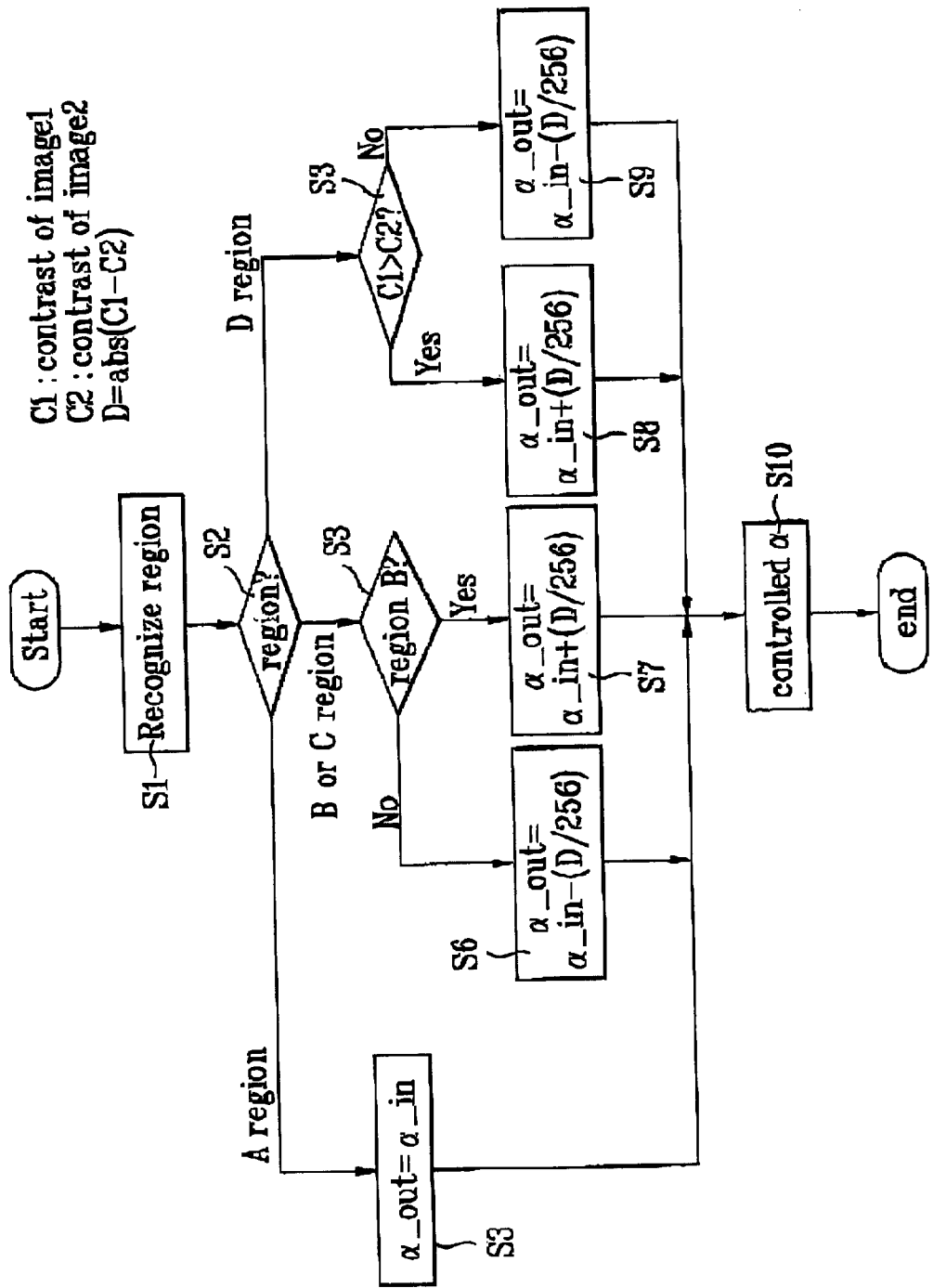
FIG. 5 is a flow chart for displaying an OSD using a blending method according to the present invention.

Such a variation of the blend ratio according to the present invention will be described with reference to FIG. 5. FIG. 5 illustrates a flow chart for displaying an OSD image according to the preferred embodiment of the present invention. In step S1, the respective regions are divided depending on the contrast of the image as shown in FIG. 4. In step S2, a contrast region is determined. Each contrast has a horizontal component, a vertical component, and a diagonal component as the two input images of the recognized regions are obtained.

In step S3, when the contrasts of the two input images are low (region A), the two input images are desirably recognized even if the blend coefficient value $\alpha$ is unchanged. Accordingly, the blend coefficient value $\alpha$ is unchanged.

Also in step S3, for the obtained contrasts of the two input images, when the contrast of one input image is high while the contrast of the other input image is low (region B or C), the blend ratio changes depending on the level of contrast. In step S6, the blend ratio is lowered by a predetermined value in the image having the low contrast. In step S7, the blend ratio is increased by a predetermined value in the image having the high contrast.

As an example, for images V1 and V2 having 8-bit input images, the following formula (2) is applied (step S6) in region C where the contrast of the image V1 is low and the contrast of the image V2 is high.

$$\alpha\_out = \alpha\_in - \frac{D}{256} \qquad (2)$$

α_out: value of a controlled blend coefficient α.
α_in: value of conventional blend coefficient α.
D: abs(contrast of V1−contrast of V2)→absolute value of abs(.):(.).

In the region B where the contrast of the image VI is high while the contrast of the image V2 is low, the following formula (3) is applied in step S7.

$$\alpha\_out = \alpha\_in + \frac{D}{256} \qquad (3)$$

In step S3, when the obtained contrasts of the two input images V1 and V2 are high (region D), the contrast of the input image V1 and the contrast of the input image V2 are compared with each other. Thus, if the contrast of the input image V1 is greater than the contrast of the input image V2, the blend ratio is increased by a predetermined value using the formula (3) in step S8. If the contrast of the input image V2 is greater than the contrast of the input image V1, the blend ratio is lowered by a predetermined value using the formula (2) in step S9. Subsequently in step S10, the controlled blend coefficient value α is obtained from the α controller 20.

As described above, the characteristics of the regions of the input images encompassing pixels to be blended are obtained so as to reflect the value α, based on the HVS. As a result, more preferable output images may be obtained that can be readily detected by the HVS.

The apparatus and method for displaying an OSD according to the present invention has the following advantages. The region search device 10 and the α controller 20 based on the HVS are added to the conventional blending system so that excellent resultant images can be obtained. Accordingly, when images having different characteristics, such as contrasts, are blended with each other, characteristics of respective images can be reflected upon the resultant images.

Furthermore, in an emerging society where ASIC technologies are being rapidly developed and visual aspects are increasingly important, the images are processed in real time. Thus the apparatus and method for displaying an OSD according to the present invention can enhance display effects.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An OSD apparatus for displaying an image using first and second video input signals and a blend coefficient value, the apparatus comprising:
   a region search device for generating an output signal, wherein the output signal is responsive to Human Visual System (HVS) characteristic elements and the first and second video input signals;
   an α controller responsive to the blend coefficient value and the output signal from the region search device, wherein the a controller outputs a controlled blend coefficient;
   a first combining unit for combining the controlled blend coefficient with the first video input signal;
   a subtractor for outputting a difference between a predetermined value and the controlled blend coefficient;
   a second combining unit for combining an output from the subtractor with the second video input signal;
   an adder for adding output values of the first combining unit and the second combining unit; and
   a rounding/limiting unit for controlling an output from the adder within a predetermined contrast range.

2. The OSD apparatus of claim 1, wherein contrasts of the first and second video input signals are used as one of the HVS characteristic elements.

3. The OSD apparatus of claim 2, wherein the contrasts of the first and second video input signal are obtained by selectively considering contrast of at least one of horizontal, vertical, and diagonal directions.

4. The OSD apparatus of claim 3, wherein the contrast is obtained by using a Y component when the first and second video input images are YUV images.

5. The OSD apparatus of claim 1, wherein at least one of frequency, background brightness and contrast is selectively used as the HVS characteristic elements.

6. The OSD apparatus of claim 1, wherein the controlled blend coefficient is determined by using contrasts of the first and second video input signals, the controlled blend coefficient being the same as the blend coefficient when contrasts of the first and the second video input signals are lower than average value of the contrasts of the first and the second video input signals.

7. The OSD apparatus of claim 1, wherein the controlled blend coefficient is determined by using contrasts of the first and the second video input signals, the controlled blend coefficient being adjusted from the blend coefficient when a contrast of one video signal is lower than average value of both contracts and a contrast of another video signal is higher than the average value of both contrasts.

8. The OSD apparatus of claim 1, wherein the controlled blend coefficient is determined by using contrasts of the first and the second video input signals, the controlled blend coefficient being adjusted from the blend coefficient when the contrasts of the first and the second video input signals are higher than average value of the contracts of the first and the second video input signals.

9. The OSD apparatus of claim 7, wherein the controlled blend coefficient is the blend coefficient adjusted by the contrast difference divided by 2n, wherein n is a number of bits representing each one of the first and the second video input signals.

10. The OSD apparatus of claim 8, wherein the controlled blend coefficient is the blend coefficient adjusted by the contrast difference divided by 2n, wherein n is a number of bits representing each one of the first and the second video input signals.

11. A system for determining a controlled blend coefficient value for use in an OSD apparatus using first and second video input signals and a blend coefficient value, the OSD apparatus including a first combining unit for combining the controlled blend coefficient with the first video input signal, a subtractor for outputting a difference between a predetermined value and the controlled blend coefficient, a second combining unit for combining an output from the subtractor with the second video input signal, an adder for adding output values of the first combining unit and the second combining unit; and a rounding/limiting unit for controlling an output from the adder within a predetermined contrast range, the system comprising:

a region search device for generating an output signal, wherein the output signal is responsive to Human Visual System (HVS) characteristic elements and the first and second video input signals; and an α controller responsive to the blend coefficient value and the output signal from the region search device, wherein the a controller outputs a controlled blend coefficient.

12. The system of claim 11, wherein contrasts of the first and second video input signals are used as one of the HVS characteristic elements.

13. The system of claim 12, wherein the contrasts of the first and second video input signal are obtained by selectively considering contrast of at least one of horizontal, vertical, and diagonal directions.

14. The system of claim 13, wherein the contrast is obtained by using a Y component when the first and second video input images are YUV images.

15. The system of claim 11, wherein at least one of frequency, background brightness and contrast is selectively used as the HVS characteristic elements.

16. The system of claim 11, wherein the controlled blend coefficient is determined by using contrasts of the first and second video input signals, the controlled blend coefficient being the same as the blend coefficient when the contrasts of the first and the second video input signals are lower than average value of the contrasts of the first and the second video input signals.

17. The system of claim 11, wherein the controlled blend coefficient is determined by using contrasts of the first and the second video input signals, the controlled blend coefficient being adjusted from the blend coefficient when a contrast of one video signal is lower than average value of both contrasts and a contrast of another video signal is higher than the average value of both contrasts.

18. The system of claim 11, wherein the controlled blend coefficient is determined by using contrasts of the first and the second video input signals, the controlled blend coefficient being adjusted from the blend coefficient when the contrasts of the first and the second video input signals are higher than average value of both contrasts.

19. The system of claim 17, wherein the controlled blend coefficient is the blend coefficient adjusted by the contrast difference divided by 2n, wherein n is a number of bits representing each one of the first and the second video input signals.

20. The system of claim 18, wherein the controlled blend coefficient is the blend coefficient adjusted by the contrast difference divided by 2n, wherein n is a number of bits representing each one of the first and the second video input signals.

21. A method for displaying an image using first and second video input signals and a blend coefficient value, the method comprising the steps of:

generating an output signal, wherein the output signal is responsive to Human Visual System (HVS) characteristic elements and the first and second video input signals;

determining a controlled blend coefficient responsive to the blend coefficient value and the output signal;

combining the controlled blend coefficient with the first video input signal to obtain a first combined output;

subtracting the controlled blend coefficient from a predetermined value;

combining a difference between the controlled blend coefficient and the predetermined value with the second video input signal to obtain a second combined output;

adding the first and the second combined outputs; and controlling a sum of the first and the second combined outputs to be within a predetermined contrast range.

22. The method of claim 21, wherein contrasts of the first and second video input signals are used as one of the HVS characteristic elements.

23. The method of claim 22, wherein the contrasts of the first and second video input signal are obtained by selectively considering contrast of at least one of horizontal, vertical, and diagonal directions.

24. The method of claim 23, wherein the contrast is obtained by using a Y component when the first and second video input images are YUV images.

25. The method of claim 21, wherein at least one of frequency, background brightness and contrast is selectively used as the HVS characteristic elements.

26. The method of claim 21, wherein the controlled blend coefficient is determined by using contrasts of the first and second video input signals, the controlled blend coefficient being the same as the blend coefficient when the contrasts of the first and the second video input signals are lower than average value of both contrasts.

27. The method of claim 21, wherein the controlled blend coefficient is determined by using contrasts of the first and the second video input signals, the controlled blend coefficient being adjusted from the blend coefficient when a contrast of one video signal is lower than average value of both contrasts and a contrast of another video signal is higher than the average value of both contrasts.

28. The method of claim 21, wherein the controlled blend coefficient is determined by using contrasts of the first and the second video input signals, the controlled blend coefficient being adjusted from the blend coefficient when the contrasts of the first and the second video input signals are higher than average value of both contrasts.

29. The method of claim 27, wherein the controlled blend coefficient is the blend coefficient adjusted by the contrast difference divided by 2n, wherein n is a number of bits representing each one of the first and the second video input signals.

30. The method of claim 28, wherein the controlled blend coefficient is the blend coefficient adjusted by the contrast difference divided by 2n, wherein n is a number of bits representing each one of the first and the second video input signals.

31. A method for displaying an OSD comprising the steps of:

recognizing the characteristics for regions of input images divided depending on characteristic elements of a Human Visual System (HVS);

obtaining characteristic elements of images inputted to the recognized region;

designating a blend coefficient in accordance with the characteristics of each region; and controlling a blend ratio of each region in accordance with the characteristic elements.

32. The method of claim 31, wherein contrasts of the images are used as the characteristic elements of HVS for search of the images.

33. The method of claim 31, wherein the step of controlling the blend ratio includes the steps of:

applying a blend ratio based on a predetermined blend coefficient when contrast of input images is lower than average value of the contrasts;

controlling the blend ratio by lowering the blend coefficient by a predetermined value for an image having a relatively low contrast while increasing the blend coefficient by a predetermined value in an image having a relatively high contrast, when the contrast of the input images is higher than average value of the contrasts; and controlling the blend ratio by lowering the blend coefficient by a predetermined value for an image having a low variation of contrast while increasing the blend coefficient by a predetermined value in an image having a low variation of contrast, when the contrast of some input images is higher than average value of the contrasts and the contrast of the other input images is lower than average value of the contrasts.

34. The method of claim 33, wherein a first input image V1 and a second input image V2 are blended using a formula, $\alpha \times V1+(1-\alpha)V2$, where the blend ratio applied is based on the predetermined blend coefficient.

35. The method of claim 33, wherein the blend coefficient is controlled to increase the blend coefficient $\alpha$ using a formula, where D is an absolute value of first image-second image and n is a bit value of input images, while it is controlled to lower the blend coefficient $\alpha$ using a formula.

36. The method of claim 31, wherein frequency characteristics of the images, brightness of a background, or contrast is selectively used as the characteristic element of HVS for search of the images.

* * * * *